United States Patent [19]
Vogel et al.

[11] 3,764,560
[45] Oct. 9, 1973

[54] BENZOIN ETHER COMPOSITIONS

[75] Inventors: Pieter Elisa Vogel, Epse; John William Broekhuis, Twello, both of Netherlands

[73] Assignees: Koninklijke Industrieele Maatschappij Noury; Van Der Lande N.V., Devanter, Netherlands

[22] Filed: Mar. 19, 1971

[21] Appl. No.: 126,312

[30] Foreign Application Priority Data

Mar. 26, 1970 Great Britain................... 14,682/70

[52] U.S. Cl............. 252/426, 204/159.23, 260/590, 260/861
[51] Int. Cl............................................. C07c 49/82
[58] Field of Search...................... 252/426; 260/590; 204/159.23

[56] References Cited
UNITED STATES PATENTS

| 2,448,828 | 9/1948 | Renfrew | 252/426 X |
| 2,647,080 | 7/1953 | Joyce | 252/426 X |

FOREIGN PATENTS OR APPLICATIONS

| 1,156,460 | 6/1969 | Great Britain | 252/426 |

OTHER PUBLICATIONS

Migrdichian, Organic Synthesis, Vol. 1 (1957), pages 76–77, Pub. by Reinhold Pub. Corp., New York, N.Y.

*Primary Examiner*—Patrick P. Garvin
*Attorney*—Stevens, Davis, Miller & Mosher

[57] ABSTRACT

A composition is disclosed which is liquid at a temperature from 0°C. to room temperature and which comprises at least two compounds which, individually, are solid at such temperature and which have the general formula

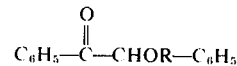

wherein R represents a straight or branched primary, secondary or tertiary alkyl radical having up to 6 carbon atoms in the main chain, at least a major portion of the composition comprising at least one compound wherein the alkyl radical has 3 – 6 carbon atoms in the main chain.

4 Claims, No Drawings

BENZOIN ETHER COMPOSITIONS

The present invention relates to a liquid composition containing at least two ethers derived from benzoin.

In the photopolymerization of ethylenically-unsaturated organic compounds and the copolymerization of unsaturated polyester resins, which are mixtures of unsaturated polyesters and polymerizable monomers, use is made of photosensitizers.

U.S. Pat. No. 2,448,828 describes the photopolymerization of ethylenically-unsaturated compounds, such as certain acrylic, methacrylic and chloroacrylic acid compounds, e.g. esters, amides and nitriles, and vinyl and vinylidene compounds, such as vinyl acetate, vinyl chloride, vinylidene chloride, styrene, isoprene and chloroprene, using benzoin methyl ether, benzoin ethyl ether or benzoin propyl ether as photosensitizers.

British Specification No. 1,156,460 discloses U.V.-curable molding and coating materials consisting of stabilized unsaturated polyester resins and, as photosensitizers, benzoin ethers of secondary alcohols, such as benzoin ethers derived from propanol-2, butanol-2, pentanol-2, pentanol-3, 3-methyl-pentanol-2 and 2,4-dimethylpentanol-3.

However, benzoin ethers derived from lower primary, secondary or tertiary alcohols have the disadvantage that they are solids at room temperature, which makes them difficult to measure into and mix with a viscous polyester resin, for example. Examples of such benzoin ethers are compounds of the general formula:

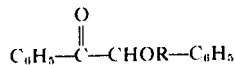

$$C_6H_5-\overset{O}{\underset{\|}{C}}-CHOR-C_6H_5$$

| R | Melting Point, °C. |
|---|---|
| $CH_3$ | 47.5–48.5 |
| $C_2H_5$ | 59–59.5 |
| $n-C_3H_7$ | 21–22 |
| $n-C_4H_9$ | 24.5–25.5 |
| $i-C_3H_7$ | 77–77.5 |
| $i-C_4H_9$ | 33–34 |
| $sec-C_4H_9$ | 45–46 |
| pentanol-3 | 5 |

Surprisingly, it has now been found (in accordance with the present invention) that compositions containing at least two compounds which, individually, are solids from room temperature to 0°C. approximately and which have the above-mentioned general formula in which R represents a straight or branched primary, secondary or tertiary alkyl radical having up to 6 carbon atoms in the main chain, at least a major portion of the composition comprising at least one such compound wherein the alkyl radical R contains 3–6 carbon atoms in the main chain, are liquids at a temperature from 0°C. to room temperature.

The liquid compositions according to the present invention may be prepared by mixing together the requisite benzoin ethers in the molten state and in the desired ratio, using conventional mixing devices. According to a preferred embodiment of the invention, however, the compositions may also be obtained by reacting benzoin with a mixture of alcohols at a temperature in the range of 60°–120°C. in the presence of an acid-reacting compound, e.g., hydrochloric acid.

Examples of benzoin ethers which, individually, are solids at a temperature in the range from room temperature to 0°C. approximately, and which are suitable for use in liquid compositions according to this invention, are the benzoin ethers of methyl alcohol, ethyl alcohol, isopropyl alcohol, n-propyl alcohol, n-butyl alcohol, isobutyl alcohol, sec-butyl alcohol, pentanol-3, pentanol-2, pentanol-1, 3-methyl-pentanol-2, 3-methyl-butanol-1 and 2-methyl-butanol-1.

The liquid compositions according to the present invention are preferably most suitable for incorporation into U.V. - curable molding and coating materials based upon unsaturated polyester resins, using conventional mixing or blending procedures.

In order that this invention may be still more readily understood, the following detailed working examples are given by way of illustration only:

EXAMPLE I 212 g of benzoin, 500 ml of n-butanol, 500 ml of isobutanol and 140 g of HCl were reacted for 2.5 hours at a temperature in the range of 60° to 120°C., e.g., 100°C. After cooling, the reaction mixture was freed from acid by washing with an aqueous 20% NaCl solution and then the volatile components were distilled off.

268 g of a composition containing equal parts by weight of benzoin n-butyl ether and benzoin isobutyl ether were obtained.

Melting point of the composition 0°C.
Melting point of benzoin n-butyl ether 25°C.
Melting point of benzoin isobutyl ether 33°C.

In this composition, each of the two components has 3 or more carbon atoms in the main chain of the alkyl group R as shown in the above-mentioned general formula.

EXAMPLE II

Liquid compositions were prepared by mixing together various benzoin ethers in the molten state, using a conventional mixing device. The mixing ratio, the benzoin ethers used and the M.P. of the compositions thus obtained are tabulated hereafter.

| R compound A | M.P. °C. | R compound B | M.P. °C. | R compound C | M.P. °C. | Mixing ratio A : B : C (mol ratios) | M.P. °C. composition |
|---|---|---|---|---|---|---|---|
| $n-C_3H_7$ | 21–22 | $n-C_4H_9$ | 24.5–25.5 | | | 1 : 1 : – | 0–10. |
| $n-C_3H_7$ | 21–22 | $i-C_4H_9$ | 33–34 | | | 1 : 1 : – | 10–20. |
| $n-C_3H_7$ | 21–22 | $i-C_4H_9$ | 33–34 | $n-C_4H_9$ | 24.5–25.5 | 1 : 1 : 1 | −10 to +10. |
| $C_2H_5$ | 59 | | | $n-C_4H_9$ | 24.5–25.5 | 1 : – : 3 | 10–20. |
| $n-C_4H_9$ | 24.5–25.5 | 3-methyl-1-butyl | Approx. 0 | | | 1 : 1 : – | Approx. 0. |
| $n-C_4H_9$ | 24.5–25.5 | n-hexyl | Approx. 0 | | | 1 : 1 : – | Approx. 0 |
| $n-C_4H_9$ | 24.5–25.5 | $C_2H_5$ | 59 | 2-methyl-1-butyl | Approx. 0 | 1 : 1 : 1 | Approx. 0. |
| $n-C_4H_9$ | 24.5–25.5 | $i-C_4H_9$ | 33–34 | 2-pentyl | Approx. 0 | 1 : 1 : 1 | Approx. 0. |
| $C_2H_5$ | 59 | $n-C_4H_9$ | 24.5–25.5 | 3-pentyl | Approx. 0 | 1 : 3 : 1 | 0–15. |
| 2-ethyl-1-hexyl | Approx. 0 | $i-C_4H_9$ | 33–34 | | | 2 : 1 : – | 0–5. |
| Trimethyl-* hexyl | 14–19 | $n-C_4H_9$ | 24.5–25.5 | $i-C_4H_9$ | 33–34 | 1 : 1 : 1 | 0–5. |

* A mixture of 3,3,5- and 3,5,5-trimethyl-hexyl (mol ratio 7 : 3).

EXAMPLE III

This example illustrates in detail precisely how the compositions of the present invention may be used in the industrial arts.

To 100 g of 65 w/w% unsaturated polyester in styrene containing 0.1 w/w% paraffin m.p. 50-54°C. (the unsaturated polyester having been prepared by reacting a mixture of 152 parts by weight of maleic anhydride, 141 parts by weight of phthalic anhydride with 195 parts by weight of 1,2-dihydroxypropane and stabilized with 0.045 parts by weight of hydroquinone) was added 1 g of the binary benzoin-butylether-mixture made according to Example 1. After mixing thoroughly by means of a film applicator a coating having a thickness of 300 microns was applied to glass test sheets. At least 10 minutes after switching on a U.V. source (H.T.Q-4 lamp ex Philips) allowing for a start-up time for the lamp to reach its maximum intensity, the coatings disposed on sheet asbestos were irradiated during 30, 45, 60, 120, 240 and 600 seconds respectively, keeping a distance of exactly 20 cm between the lamp body and the coatings. One hour after irradiation the hardness of the coating was determined with the aid of a Persoz hardness meter type NFT 30-016 and expressed in seconds oscilation time (P-sec.) in the following table:

| Irradiation time in sec. | 30 | 45 | 60 | 120 | 240 | 600 |
|---|---|---|---|---|---|---|
| Hardness in P-sec. | 40 | 115 | 160 | 260 | 329 | 377 |

What is claimed is:

1. A composition which is liquid at a temperature from 0°C. to room temperature and which consists essentially of at least two compounds which individually are solid at such temperature and have the general formula:

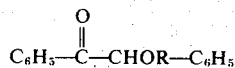

wherein R represents a straight or branched primary, secondary or tertiary alkyl radical having up to 6 carbon atoms in the main chain, at least a major portion of the composition consisting essentially of at least one compound wherein the alkyl radical has 3–6 carbon atoms in the main chain.

2. A composition according to claim 1, in which R is selected from the class consisting of $-CH_3$, $-C_2H_5$, $n-C_3H_7$, $i-C_3H_7$, $n-C_4H_9$, $-CH.CH_3.C_2H_5$, $-CH(C_2H_5)_2$, $-CH.CH_3.C_3H_7$, $-CH_2.C_4H_9$, $-CH.CH_3.CH.CH_3.C_2H_5$, $-CH_2.CH(CH_3)_2$ and $-CH_2.CH.CH_3.C_2H_5$.

3. A process for preparing a composition according to claim 1, comprising reacting benzoin with a mixture of alcohols having the general formula ROH, wherein R has the meaning defined in claim 1, at a temperature in the range of 60°-120°C. in the presence of an acid-reacting compound, the major portion of the alcohol mixture being an alcohol wherein the alkyl radical contains 3-6 carbon atoms in the main chain, and distilling off the volatile components.

4. A process according to claim 3, in which the reaction is carried out in the presence of hydrochloric acid as the acid-reacting compound.

* * * * *

UNITED STATES PATENT OFFICE
CERTIFICATE OF CORRECTION

Patent No. 3,764,560   Dated October 9, 1973

Inventor(s) PIETER ELISA VOGEL & JOHN WILLIAM BROEKHUIS

It is certified that error appears in the above-identified patent and that said Letters Patent are hereby corrected as shown below:

Item [73] lines 2 and 3
Name of Assignee and address of Assignee should read as follows:

Noury & Van der Lande N.V.
Deventer, The Netherlands

Signed and sealed this 23rd day of April 1974.

(SEAL)
Attest:

EDWARD M. FLETCHER, JR.
Attesting Officer

C. MARSHALL DANN
Commissioner of Patents